United States Patent [19]

Klass et al.

[11] Patent Number: 4,561,864

[45] Date of Patent: Dec. 31, 1985

[54] GAS SWEETENING BY MEMBRANE PERMEATION

[75] Inventors: Donald L. Klass, Barrington; Carl D. Landahl, Chicago, both of Ill.

[73] Assignee: Institute of Gas Technology, Chicago, Ill.

[21] Appl. No.: 660,020

[22] Filed: Oct. 12, 1984

Related U.S. Application Data

[63] Continuation-in-part of Ser. No. 63,057, Aug. 2, 1979, abandoned, which is a continuation of Ser. No. 876,225, Feb. 9, 1978, abandoned, which is a continuation-in-part of Ser. No. 453,210, Mar. 21, 1974, abandoned.

[51] Int. Cl.$^4$ .............................................. B01D 53/22
[52] U.S. Cl. .............................................. 55/16; 55/73
[58] Field of Search .................... 55/16, 68, 73, 158

[56] References Cited

U.S. PATENT DOCUMENTS

| | | | |
|---|---|---|---|
| 3,256,675 | 6/1966 | Robb | 55/16 |
| 3,415,038 | 12/1968 | Merten et al. | 55/16 |
| 3,534,528 | 10/1970 | Porter | 55/16 |
| 3,709,774 | 1/1973 | Kimura | 55/16 X |
| 3,798,185 | 3/1974 | Skiens et al. | 55/158 X |
| 4,130,403 | 12/1978 | Cooley et al. | 55/16 |

Primary Examiner—Robert Spitzer
Attorney, Agent, or Firm—Emrich & Dithmar

[57] ABSTRACT

A sour gas mixture containing methane gas, hydrogen sulfide and carbon dioxide is applied to a nonhomogeneous membrane having a combined separation factor for hydrogen sulfide and carbon dioxide at least about 20. The gas mixture is delivered to the membrane at a Flow Rate Factor on the order of about 8 so that the Merit Factor of the membrane is maximized.

7 Claims, 1 Drawing Figure

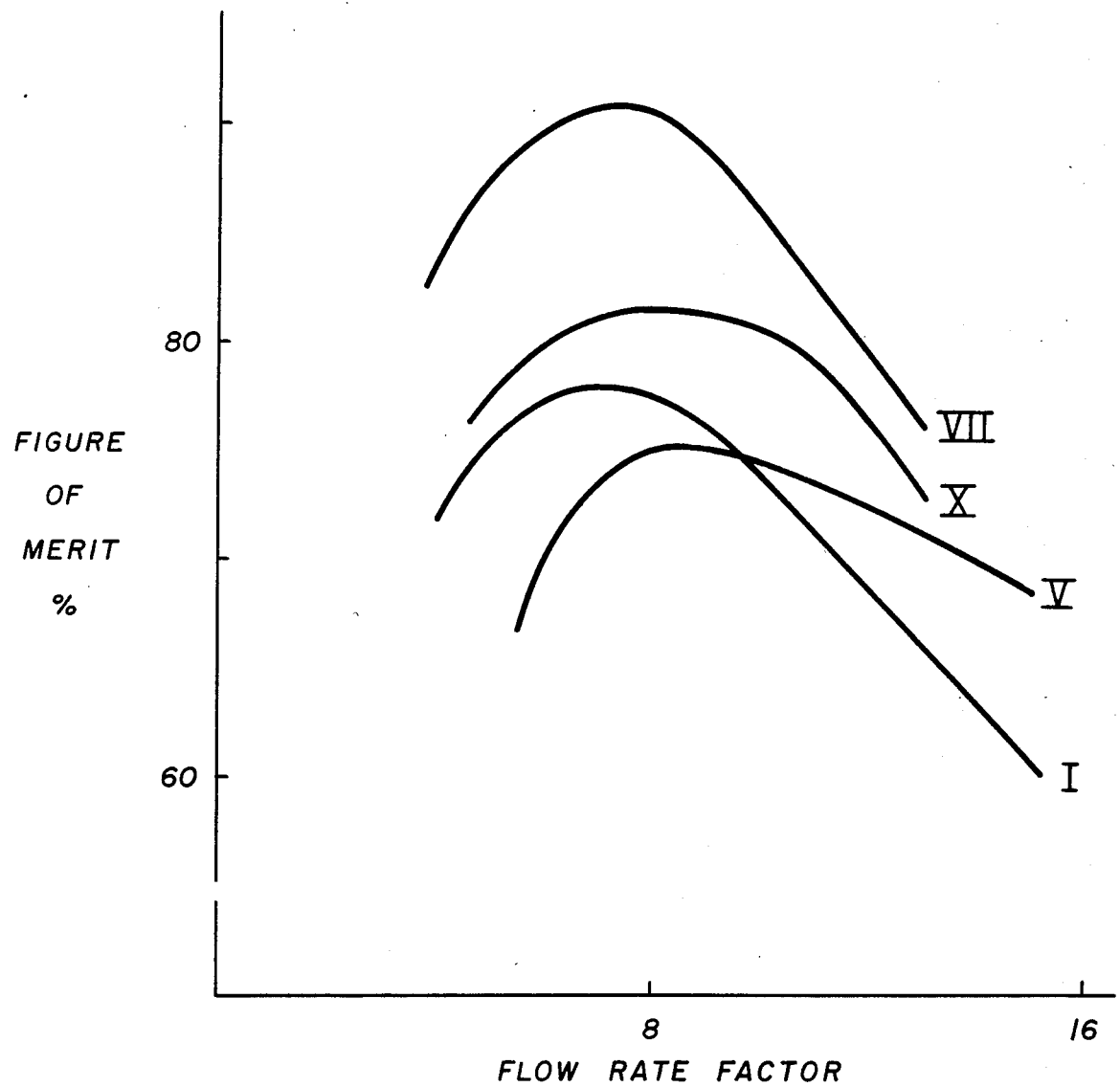

GAS SWEETENING BY MEMBRANE PERMEATION

CROSS-REFERENCE TO RELATED APPLICATIONS

This application is a continuation-in-part of application Ser. No. 63,057, filed Aug. 2, 1979, which in turn is a continuation of application Ser. No. 876,225, filed Feb. 9, 1978, which in turn is a continuation-in-part of application Ser. No. 453,210, filed Mar. 21, 1974, all entitled "Gas Sweetening by Membrane Permeation" and all naming as inventors Donald L. Klass and Carl D. Landahl, and all now abandoned.

BACKGROUND OF THE INVENTION

This invention relates to a method for sweetening sour gas by delivering it to a semipermeable membrane which is highly permeable to particular sour gas components in the sour feed gas but is highly impermeable to methane and other fuel components in the feed gas.

It is a recognized goal to sweeten sour gas by removing the sour gas components, hydrogen sulfide and carbon dioxide. These acidic components are objectionable because they cause corrosion and their presence reduces the concentration of the desirable methane component so as to upset desired fuel levels. The hydrogen sulfide component is further objectionable because of its offensive smell and toxicity.

The prior art has been concerned with this problem and several methods for sweetening gas have been developed. Porter U.S. Pat. No. 3,534,528 discloses a bundle of semipermeable capillary filters to separate hydrogen sulfide from methane. Kimura U.S. Pat. No. 3,709,774 discloses methods of making asymmetric membranes composed of cellulose acetate, for use in gas separation. Merten et al. U.S. Pat. No. 3,415,038 discloses membranes for separating one gas from a mixture of gases wherein the pressure ratio of the gas across the membrane is 10,000:1.

SUMMARY OF THE INVENTION

It is an important object of the present invention to provide a method for separating the hydrogen sulfide and the carbon dioxide in a feed gas mixture at a high figure of merit.

Another object in connection with the foregoing object is to provide such a method wherein the flow rate factor FRF is on the order of about 8 to insure that the figure of merit is maximized.

In summary, there is provided a method for sweetening a gas mixture which contains methane gas, hydrogen sulfide and carbon dioxide, comprising the steps of providing a gas mixture which contains methane gas and hydrogen sulfide and carbon dioxide, providing nonhomogenous membrane means having a combined separation factor for the hydrogen sulfide and the carbon dioxide of at least 20, delivering the gas mixture to the membrane at a flow rate factor (FRF) on the order of about 8, wherein $$FRF = V/(A)(PD)(PR)$$

wherein V is the rate of delivery of the gas mixture to the membrane, A is the area of the membrane, PD is the pressure difference across the membrane and PR is the permeation rate of the membrane for methane, whereby the merit factor of the membrane is maximized.

The invention consists of certain novel features and a combination of steps hereinafter fully described and particularly pointed out in the appended claims, it being understood that various changes in the details may be made without departing from the spirit, or sacrificing any of the advantages of the present invention.

BRIEF DESCRIPTION OF THE DRAWING

The single FIGURE is a graph in which the Flow Rate Factor is plotted against the Figure of Merit for membranes with various Combined Separation Factors.

DETAILED DESCRIPTION OF THE PREFERRED EMBODIMENTS

A sour gas mixture contains methane and sour components such as hydrogen sulfide and carbon dioxide. Usually, the sour gas has a greater carbon dioxide concentration (10% or more) while the concentration of hydrogen sulfide is less than 1%. There may be other sour gas components present. The sour gas mixture may be dry or may contain water to saturation. The method disclosed herein simultaneously removes the hydrogen sulfide and the sour gas components to provide a "sweet gas", meaning a gas of high quality containing at least 99% methane and less than about 1% sour gas components. Specifically, the sweet gas should contain a concentration of carbon dioxide of less than 1% and hydrogen sulfide of less than 20 ppm.

In this application, the desired output is referred to as methane. It is understood that the term "methane" as used herein shall be taken to include other fuel components, such as ethane, propane and other lighter hydrocarbons.

The sour feed gas mixture is delivered to a semipermeable membrane. The sour gas components pass through the membrane and are collected. The membrane is basically impervious to the methane or "sweet gas".

The basic enrichment process whereby the concentration of the methane is increased with respect to the feed gas mixture is characterized by what is referred to herein as the "Figure of Merit". The higher the Figure of Merit (M), the more efficiently the membrane is performing. The Figure of Merit is the product of the Quality (Q) of the methane and the Recovery (R) of the methane. Q is a ratio, wherein the numerator is the difference between the percentage concentrations of methane in the product and the feed. The denominator is the difference between 100% and the percentage concentration of methane in the feed. The Recovery (R) is the ratio of the rate of delivery of the sweet gas from the membrane to the rate of delivery of the feed gas mixture to the membrane.

The term "separation factor" is the ratio of the permeability constants of two gases for a given membrane under the same conditions. Thus, a particular membrane has an inherent separation factor for methane and hydrogen sulfide. If the separation factor is 10, for example, the membrane is ten times more permeable to hydrogen sulfide than to methane. That same membrane will have an inherent separation factor for methane and carbon dioxide. The term "Combined Separation Factor" is the sum of the separation factors for hydrogen sulfide/methane on the one hand and carbon dioxide/methane on the other hand.

Nonhomogenous membranes have high Combined Separation Factors for both of the sour components hydrogen sulfide and carbon dioxide, and have acceptable permeability constants to attain efficient permeation.

The Flow Rate Factor (FRF) relates to the utility and effectiveness of the membrane. It is determined according to the following formula:

$$FRF = V/(A)(PD)(PR)$$

wherein V is the rate of delivery of the gas mixture to the membrane, A is the area of the membrane, PD is the pressure difference across the membrane and PR is the permeation rate of the membrane for methane.

Surprisingly, it has been determined that a maximum Figure of Merit can be attained if two conditions are met. First, the combined separation factor should be at least 20. Secondly, the flow rate factor (FRF) should be on the order of about 8. If the FRF is not about 8, the figure of merit is reduced substantially.

Nonhomogenous membranes satisfy these conditions. They may be of such constructions as to have a combined separation factor within the specified range. Furthermore, they can be used under conditions to achieve a Flow Rate Factor of about 8. When using homogenous membranes, it is necessary to balance the factors of high separation and lower permeability. It has been found that more favorable combinations of separation factors and permeability constants are attained with anisotropic membranes, as well as composite membranes, both being nonhomogenous.

A comparison was made of the permeation rates of homogenous and nonhomogenous membranes of cellulose acetates. It was found that the permeation rate is dramatically greater for nonhomogenous forms of the membrane as compared to the homogenous forms. Generally, homogenous membrane types will not be found operable at an FRF of about 8.

In comparing homogenous and nonhomogenous membranes, an open mesh cloth member was provided for structural support of the membrane. Permeation through the nonhomogenous form of the membrane is far in excess of the homogenous form.

An "anisotropic" membrane is one that is integrally formed, having a thin skin on one side and the balance being a thicker, more porous material. It is characteristic of anisotropic membranes that their permeation properties are not uniform in all directions. They may be wet or dry. In particular, permeation rates through anisotropic membranes compared with homogenous membranes of the same overall thickness are considerably higher. Anisotropic membranes are preferred in a "sheet" configuration but may be used to advantage in other forms including tubular or concentric.

A variety of anisotropic membranes may be utilized such as polymers of polyvinylidene chloride (particularly near homopolymers), polyacrylonitrile, or the cellulose acetate membranes. The useful membranes include the cellulose diacetate and the cellulose tiacetate membranes. Also useful are materials such as gelatin, nylon 6 and 6/6, polyvinyl alcohol membrane, polystryene, polyurethane, PVC, vinylidene copolymers, and the like.

The multi-layer or composite membranes generally have a thin layer supported by a thicker polymer.

Current belief holds that permeability of gas through a membrane is characterized by either diffusion through the membrane assisted by chemical interaction or by (1) solubility of the gas in the membrane material and (2) diffusion of the gas through the membrane. Permeation of any single gas is therefore viewed as being the product of the solubility and the diffusivity of a given gas in the membrane. Each membrane composition has a particular permeability constant (K) for a given gas. The permeation rate of a gas is dependent on K and also membrane thickness, nature of the membrane, layers of the membrane involved, differential pressures, temperatures, and possibly still other factors.

It has been found that the required membrane area may be substantially reduced if feed pressures are higher and permeate pressures are lower. Generally, the feed pressure is greater than atmospheric pressure. In practice, it is preferred that the feed pressure be substantially greater, say, at least 5-fold over the permeate pressure. The feed pressure can be attained in various ways such as from the flow rate of the sour gas mixture along the closed path against the face of the membrane. The permeate pressure may likewise be provided in various ways, such as providing an enclosure to one side of the membrane and evacuating the chamber formed therein. Such pressure gradients may be provided by resort to the usual skills recognized by practitioners.

A particular embodiment included a square permeator having a membrane. The permeator included a row of ports to enable the feed gas to flow across the membrane at one edge thereof. The methane did not permeate through the membrane, and exited through a parallel row of ports along the opposite edge of the membrane. The permeated gas flowed out to rows of ports located at opposite sides of the membrane. The membrane was supported on filter paper caulked around the edge with a silicone rubber sealant. Feed gas pressure was regulated and fed to the cell assembly and to a manifold leading to a gas chromatograph. The nonpermeated gas (fuel components) flowed from the cell through a variable restrictor to a flow indicator or chromatograph. The permeated gas (sour components) was applied to a flow indicator or the chromatograph directly for operation near atmospheric pressure. During measurements on the permeated gas side of the membrane at subatmospheric pressures, a pump was placed in the line before the flow indicator and chromatograph. Adjustments of the variable restrictor in the reject stream allowed variation of the ratio of permeated gas flow to reject flow. The reject flow was set approximately and time was allowed for equilibration of flow through the membrane. The feed gases were analyzed by mass spectrometry. The permeated gas and the nonpermeated gas flows were measured and analyzed in succession.

A sour gas feed mixture was delivered to the square permeator. The mixture contained hydrogen sulfide at a concentration ranging from about 0.02 to 0.56%, and carbon dioxide at a concentration ranging from 1.0 to 10.3%. The feed pressures ranged from 19 to 215 psia while the permeated gas stream pressure was maintained at near vacuum (0.1–0.3 psia) or at atmospheric pressure. A feed gas containing 90% methane, 10% carbon dioxide, and 0.02 to 0.04% hydrogen sulfide showed an increase in sweetening performance with increased feed pressure for a permeate pressure of 15 psia.

In another embodiment, a polyamide membrane, nylon 6, was evaluated at different temperatures for a sour gas mixture including 1.1 mol % of carbon dioxide and 0.5 mol % of hydrogen sulfide. A permeator was used similar to that described above, except it was modified to allow the output side of the membrane to be swept with helium into sample loops of known volume which was switched into the chromatograph carrier stream for analysis. The input side of the membrane was held at a constant total pressure 65 psia.

A polyvinyl alcohol membrane was evaluated under the same conditions as the nylon 6 membrane. Following selected loop valve actuation, a permeated gas sample passed successively through one chromatograph column, one side of a dual-bead thermistor detector, a second chromatographic column, the other side of the detector, and finally to atmosphere. The gases were analyzed by mass spectrometry for methane and carbon dioxide, and by the iodine titration method for hydrogen sulfide.

Both of the membranes tested exhibited moderate to high separation factors for both hydrogen sulfide and carbon dioxide with respect to methane. A value of 50 was obtained at 70° C. for nylon 6 and hydrogen sulfide, while a value greater than 100 was obtained at 50° C. for the polyvinyl alcohol membrane and carbon dioxide. The hydrogen sulfide-methane separation factor for polyvinyl alcohol decreased above 50° C., but the nylon 6 membrane showed an increased hydrogen sulfide-methane separation factor as the temperature increased from 30° C. to 70° C. The carbon dioxide separation factors tended to decrease with increasing temperature over the range of 30° C. to 70° C.

Similar procedures were followed to evaluate gelatin, polyacrylonitrile and nylon 6/6. The gelatin was plasticized with glycerin. All three membranes showed high separation factors, the separation factor for polyacrylonitrile being 160 at 30° C. and 120 at 50° C. Both methane and carbon dioxide permeability increased with temperature, with methane showing the greater increase. Heat stabilized nylon 6/6 showed high separation factors, generally showing improvement over nylon 6 as a membrane sweetening system. The pigmented animal gelatin membrane showed an increase in the hydrogen sulfide-to-methane separation factor at 50° C. compared with the high value of 200 at 30° C.

In the following ten examples a Flow Rate Factor of about 8 resulted in a maximum Figure of Merit.

feed gas on the membrane in psia. The Feed Temperature is the temperature of the feed gas in degrees Fahrenheit. The Feed Composition is the percent of methane in the feed gas. The Feed Flow is the rate of delivery of the feed gas to the membrane in standard cubic feet per hour. The Permeate Pressure is the pressure on the permeate side of the membrane in psia. The Product Pressure is the pressure applied by the feed gas to the membrane in psia. The Product Composition is the percentage of methane or other fuel components in the product. The Product Flow is the rate of delivery from the membrane of the desired gas component in standard cubic feet per hour. The Permeation Rate is the rate of permeation of methane through the membrane in standard cubic feet per hour per square foot per psi of methane partial pressure across the membrane. The Separation Factor represents the total of the separation factors of the two sour gas components, hydrogen sulfide and carbon dioxide. The Pressure Difference represents the difference in pressure between the Feed Pressure and the Product Pressure in psi.

The composition of the membranes in each of the ten examples was nonhomogenous, anisotropic cellulose acetate.

Referring now to the graph accompanying this application, there is depicted therein curves in which Figure of Merit is plotted against Flow Rate Factor for four of the examples, namely, examples I, V, VII and X. It is noted that each of these curves has a maximum Figure of Merit approximately at a Flow Rate Factor of about 8. For example, example VII has a Figure of Merit of 88 at a Flow Rate Factor of 8; example X has a maximum Figure of Merit of 82 at a Flow Rate Factor of 8.7; example I has a Figure of Merit of about 78.9 at a Flow Rate Factor of 8; and the maximum Figure of Merit for example V is 75 at a Flow Rate Factor of 8. This graph clearly shows that maximum Figures of Merit for nonhomogenous membranes can be achieved when the Flow Rate Factor of the membrane is on the order of about 8.

The above description is based on a single membrane in a single permeator to achieve the desired Flow Rate Factor on the order of about 8. However, such result could be achieved in other ways. For example, a number of permeators, each with its associated membrane, can make up a system, which as a whole has the desired

|  | I | II | III | IV | V | VI | VII | VIII | IX | X |
|---|---|---|---|---|---|---|---|---|---|---|
| Figure of Merit | 78.9% | 77% | 78% | 87+% | 75% | 77% | 88% | 93+% | 81% | 82% |
| Flow Rate Factor | 8.0 | 8.6 | 7.7 | 8.8 | 8.0 | 7.1 | 8 | 8+ | 8.4 | 8.7 |
| Size | 30 | 60 | 12.7 | 30 | 30 | 12.7 | 30 | 30 | 30 | 30 |
| Feed Pressure | 1015 | 1615 | 960 | 820 | 215 | 820 | 1015 | 1015 | 215 | 1615 |
| Feed Temperature | 80 | 80 | 90 | 90 | 70 | 100 | 70 | 70 | 70 | 70 |
| Feed Composition | 90 | 90 | 70 | 70 | 50 | 90 | 70 | 70 | 80 | 50 |
| Feed Flow | 360 | 1238 | 195 | 1277 | 967 | 1443 | 480 | 240 | 100 | 587 |
| Permeate Pressure | 15 | 15 | 15 | 20 | 15 | 20 | 15 | 15 | 15 | 115 |
| Product Pressure | 1015 | 1615 | 960 | 820 | 215 | 820 | 1015 | 1015 | 215 | 1615 |
| Product Composition | 99 | 99 | 97 | 99+ | 95 | 99+ | 99+ | 99+ | 99 | 99 |
| Product Flow | 287 | 962 | 154 | 813 | 555 | 1123 | 309 | 163 | 69 | 248 |
| Permeation Rate | .0015 | .0015 | .002 | .006 | .02 | .002 | .002 | .001 | .002 | .0015 |
| Separation Factor | 20 | 20 | 20 | 45 | 30 | 20 | 80 | 120 | 80 | 50 |
| Pressure Difference | 1000 | 1600 | 945 | 800 | 200 | 800 | 1000 | 1000 | 200 | 1500 |

In each example in the above table, the parameters are listed when the Figure of Merit was maximized. The Figures of Merit in these examples were between 75% and 93%. The Flow Rate Factor of each example was in the range of 7.1 to 8.8; that is, on the order of about 8. The Size represents the area of the membrane in square feet. The Feed Pressure is the pressure of the Flow Rate Factor. The different membranes may be of different compositions and the permeators may be connected in parallel or series, to provide as a whole a Flow Rate Factor on the order of about 8. Alternatively, the system could be comprised of a number of identical modules interconnected in ways known to those skilled in the art to cause the system as a whole to have a Flow Rate Factor on the order of about 8.

Composite membranes are well suited to enable selection of the Flow Rate Factor. By adjusting the thicknesses and/or compositions of the layers defining a composite membrane, a Flow Rate Factor on the order of about 8 can be achieved.

While there have been described what are at present considered to be the preferred embodiments of the invention, it will be understood that various modifications may be made therein and it is intended to cover in the appended claims all such modifications as fall within the true spirit and the scope of the invention.

We claim:

1. A method for sweetening a gas mixture which contains methane gas, hydrogen sulfide and carbon dioxide, comprising the steps of providing a gas mixture which contains methane gas and hydrogen sulfide and carbon dioxide, providing nonhomogenous membrane means having a combined separation factor for the hydrogen sulfide and the carbon dioxide greater than about 20, delivering the gas mixture to said membrane at a flow rate factor (FRF) on the order of about 8, wherein $$FRF = V/(A)(PD)(PR)$$

wherein V is the rate of delivery of the gas mixture to said membrane, A is the area of said membrane, PD is the pressure difference across said membrane and PR is the permeation rate of said membrane for methane, whereby the merit factor of said membrane is maximized.

2. The method as set forth in claim 1, wherein said membrane means is composed of cellulose acetate.

3. The method set forth in claim 1, wherein said membrane means is composed of nylon 6.

4. The method set forth in claim 1, wherein said membrane means is composed of polyvinyl alcohol.

5. The method set forth in claim 1, wherein said membrane means is composed of gelatin.

6. The method set forth in claim 1, wherein said membrane means is composed of nylon 6/6.

7. The method set forth in claim 1, wherein said membrane means is composed of polyacrylonitrile.

* * * * *